US006923403B1

(12) United States Patent
Dizdarevic et al.

(10) Patent No.: US 6,923,403 B1
(45) Date of Patent: Aug. 2, 2005

(54) TAILED FLYING WING AIRCRAFT

(76) Inventors: Faruk Dizdarevic, 3300 W. Lincoln Ave. #129, Anaheim, CA (US) 92801; Mithad Dizdarevic, 3300 W. Lincoln Ave. #129, Anaheim, CA (US) 92801

( * ) Notice: Subject to any disclaimer, the term of this patent is extended or adjusted under 35 U.S.C. 154(b) by 136 days.

(21) Appl. No.: 10/803,307

(22) Filed: Mar. 18, 2004

(51) Int. Cl.$^7$ ................................................. B64C 1/00
(52) U.S. Cl. .......................... 244/13; 244/36; 244/117 R
(58) Field of Search .......................... 244/12.1, 13, 36, 244/117 R, 119, 54, 91

(56) References Cited

U.S. PATENT DOCUMENTS

| 1,893,129 | A |  | 1/1933 | Charpentier |
| 2,123,096 | A |  | 7/1938 | Charpentier |
| 2,294,367 | A |  | 9/1942 | Flaming |
| 2,402,358 | A |  | 6/1946 | Bauman |
| 2,406,506 | A |  | 8/1946 | Northrop |
| 2,412,646 | A |  | 12/1946 | Northrop |
| 2,557,962 | A |  | 6/1951 | Greene |
| 2,616,639 | A |  | 11/1952 | Burnell |
| 2,650,780 | A |  | 9/1953 | Northrop |
| 2,734,701 | A |  | 2/1956 | Horton |
| 3,216,673 | A |  | 11/1965 | Alter et al. |
| 3,576,300 | A |  | 4/1971 | Palfreyman |
| 3,608,850 | A |  | 9/1971 | Fredericks |
| 3,625,459 | A |  | 12/1971 | Brown |
| 3,630,471 | A |  | 12/1971 | Fredericks |
| 3,761,041 | A |  | 9/1973 | Putnam |
| 3,869,102 | A |  | 3/1975 | Carroll |
| 4,149,688 | A |  | 4/1979 | Miller, Jr. |
| 5,082,204 | A |  | 1/1992 | Croston |
| 5,893,535 | A | * | 4/1999 | Hawley ........................ 244/119 |
| 5,909,858 | A | * | 6/1999 | Hawley ........................ 244/36 |
| 6,098,922 | A |  | 8/2000 | Hahl |
| 6,578,798 | B1 |  | 6/2003 | Dizdarevic |
| 6,666,406 | B2 |  | 12/2003 | Sankrithi |
| 6,708,924 | B2 | * | 3/2004 | Page et al. ...................... 244/36 |

OTHER PUBLICATIONS

"Model 1" French Journal: Gazette—Air & Cosmos No. 1386, Jul. 1992, p. 4.
"Model 2" French Journal: Gazette—Air & Cosmos No. 1386, Jul. 1992, p. 4.
Blended Wing Body (BWB) Project.

* cited by examiner

Primary Examiner—J. Woodrow Eldred

(57) ABSTRACT

The "Tailed Flying Wing Aircraft" idea represents new aerodynamic concepts for large high subsonic aircraft. Large high subsonic aircraft based on these new aerodynamic concepts are having a significantly higher lift capacity and longer range, as well as a significantly lower fuel consumption of at least two times less than the aircraft based on classical fuselage concept with the same external dimensions. In addition, the aircraft based on the new concepts are having a significantly better longitudinal stability and maneuverability, as well as aerodynamic efficiency at high subsonic speed than aircraft based on "Tailless Flying Wing" concepts. The aircraft based on the "Tailed Flying Wing Aircraft" idea satisfy all safety requirements for civil aircraft. They also have simple shapes for manufacturing, hence this idea provides for new realistic advanced aerodynamic concepts for the next generations of large subsonic aircraft.

3 Claims, 3 Drawing Sheets

FIG 1A  FIG 1B

Figure 1C:
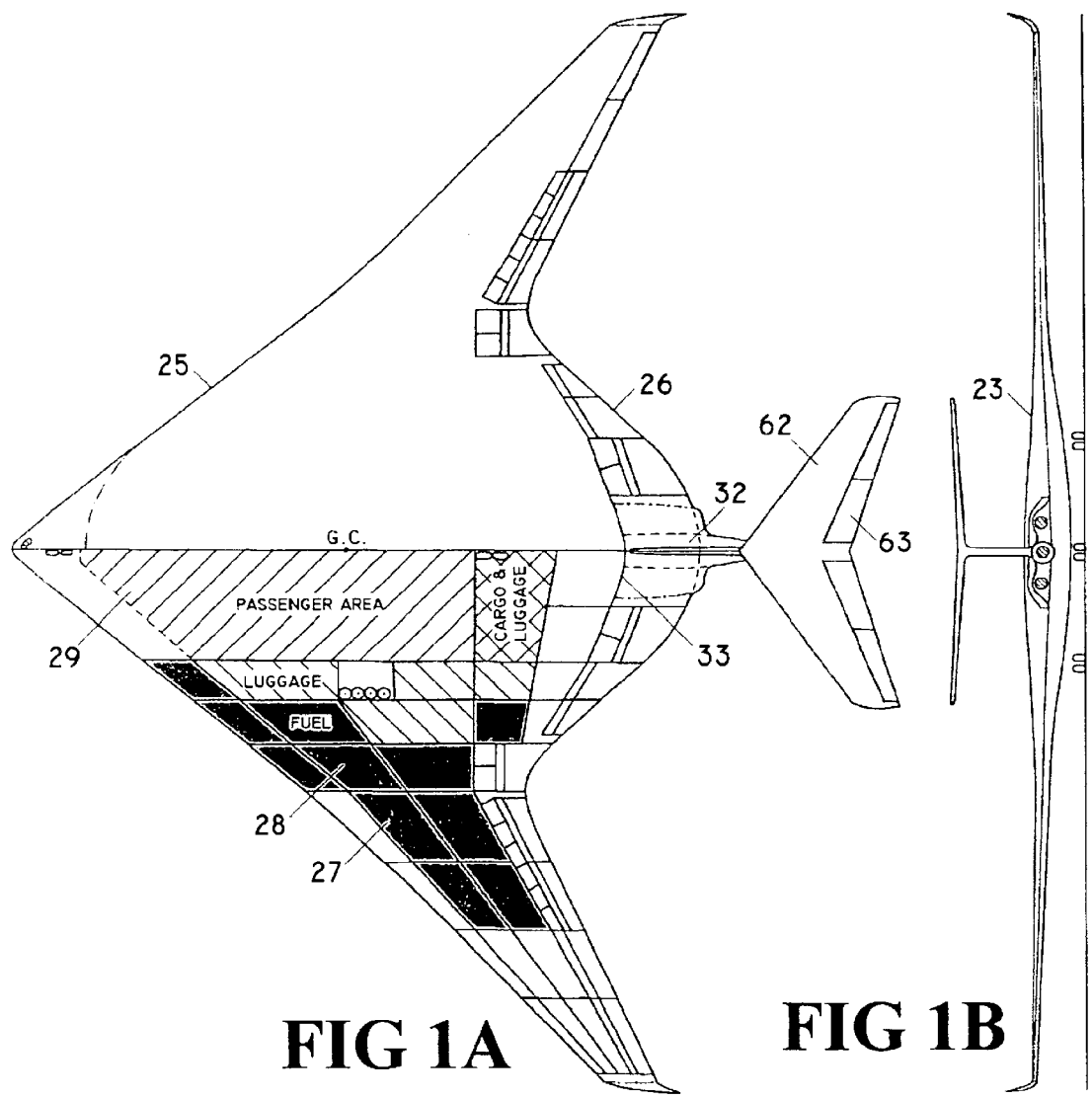

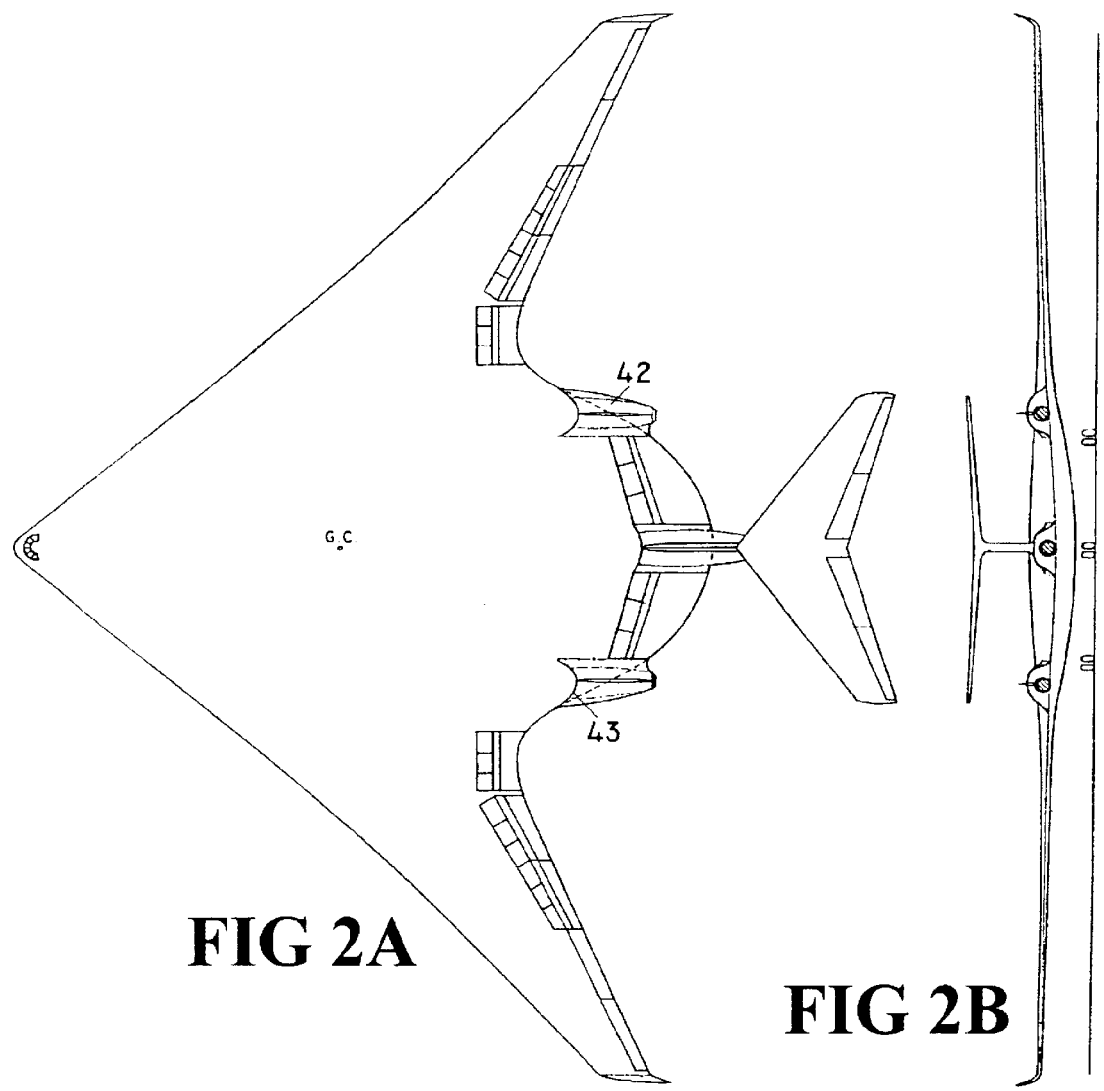
FIG 2A
FIG 2B
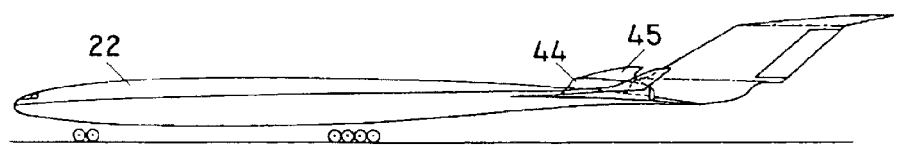
FIG 2C

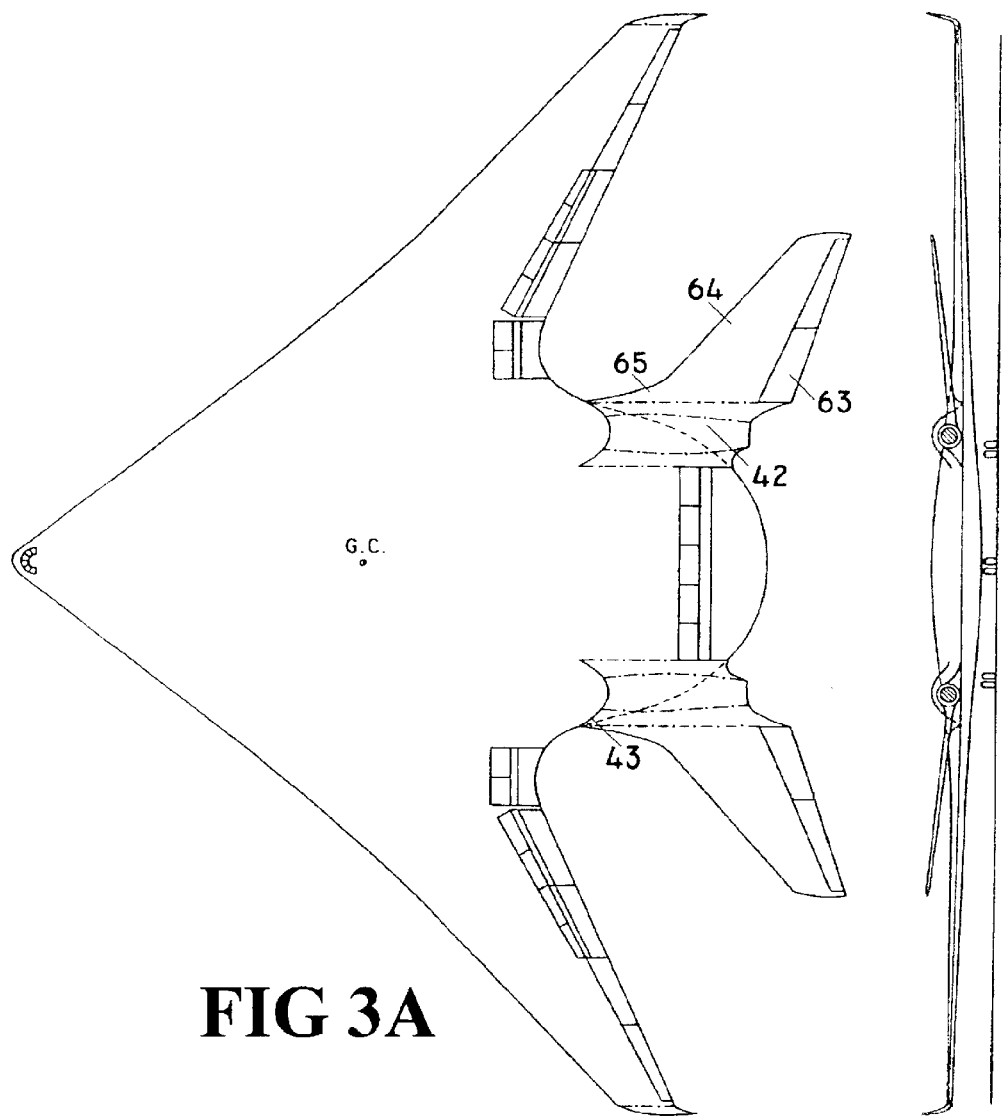
FIG 3A
FIG 3B
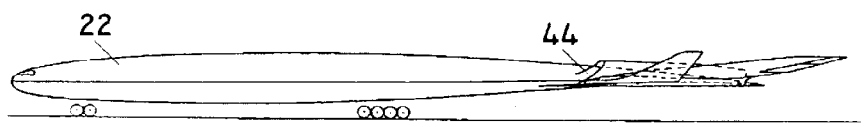
FIG 3C

TAILED FLYING WING AIRCRAFT

BACKGROUND OF THE INVENTION

This invention relates to a new general aerodynamic concept for high-subsonic large civil and military aircraft with a goal to drastically reduce fuel consumption at high subsonic speed and significantly increase lift capacity and range of aircraft relatively to existing classical concept aircraft with simultaneous reduction in external dimensions of aircraft, as well as reduction in runway length in order to utilize existing airport facilities. The new concept simultaneously provides for significantly better stability, maneuverability, and safety relatively to the existing concepts based on the idea of tailless flying wing.

Increase in air traffic volume and very dynamic development thereof have set very challenging goals with respect to moving ever larger payloads safely at large distances as fast as possible at low cost. The former goals have generated very intense research efforts and development of new aerodynamic concepts, materials, and new energy sources.

At the beginning of the $20^{th}$ century, the classical concept of aircraft had been established based on three basic premises: aircraft wings to generate necessary lift, tail surfaces for pitch and yaw control and fuselage unit with the purpose to connect wings and tail surfaces into one piece and provide space for payload accommodation. The relatively simple cigar-like fuselage shape is favorable from the aspect of passenger area pressurization, simple adjustments of wing and tail positions relatively to gravity center with the purpose of providing for a good stability and maneuverability of aircraft. All of this resulted in prevailing dominance of this concept for an entire century. The response to requirements for lower fuel consumption, high speed, and longer range was sought mainly in development of new and more efficient airfoils, redesign of transitional surfaces between fuselage and aerodynamic surfaces to increase aerodynamic efficiency, as well as in development of new materials and more efficient engines. The results of this search did not fully meet market demands so that in the past two to three decades the solutions for reduction of transportation cost have been sought by increasing payload capacity and thereby the external dimensions of aircraft, which resulted in significant increase of parasitic drag of fuselage with wing spans reaching critical size that limits maneuver of aircraft on the ground. It is obvious today that further significant advances in payload increase and reduction of air transportation cost is only possible with new aircraft concepts by significantly reducing already drastically increased fuselage parasitic drag.

The ideas to eliminate fuselage parasitic drag date back to 1930s when attempts were made to shape aircraft fuselage as an airlifting surface. All previous ideas and inventions can be categorized in two groups:
  a) Separately shaped fuselages as airlifting surfaces
  b) Total integration of payload space with wings into a single airlifting surface called "flying wing" or "flying body"

The following U.S. patents fit into the first category: 1,893,129; 2,123,096; 2,557,962; 2,616,639; 3,216,673; 3,869,102; 6,098,922; 6,606,406.

U.S. Pat. Nos. 2,557,962; 3,216,673 and 6,666,406 refer to methods to shape only the central fuselage section or a part thereof into a single aerodynamic surface wherein two lateral fuselages are preserved to which wings and tail surfaces are connected. Very complex configuration of these aircraft generates high interference drag between aircraft sections. Simultaneously, the central section with relatively thick airfoils generates high airfoil drag especially at high flight speed. These solutions can contribute to increase in payload capacity of aircraft to some extent. However, the aerodynamic efficiency of these aircraft is significantly lower when compared to modern aircraft with classical design concept. Also, manufacturing costs would be significantly higher for these aircraft.

U.S. Pat. No. 1,893,129 anticipates a central section of the wing with elongated chords that is used as a fuselage. The leading edge of the central section and external wings intersects each other in a point, thereby preventing generation of induced drag on the leading edge. The central section is separated from external wings by a vertical aerodynamic former, which behind external wings performs as both a winglet to reduce the generation of induced drag in the rear portion of the central section, as well as a fin with rudder.

U.S. Pat. No. 2,123,096 anticipates a similar solution as in U.S. Pat. No. 1,893,129, however, with the shape of aerodynamic formers being somewhat changed between the central section and external wings. The basic shortcoming of both of these patents is insufficient longitudinal stability and pitch maneuver.

The following U.S. patents, publications, and projects full into the second category: U.S. Pat. Nos. 2,294,367, 2,402,358, 2,406,506, 2,412,646, 2,650,780, 3,576,300, 3,761,041, 4,149,688, 5,082,204, 6,578,798; Model 1 and Model 2 published in French Journal Air & Cosmos No. 1386 in 1992 (attached in the patent application); BWB (Blended Wing Body) project.

U.S. Pat. Nos. 2,294,367 and 2,402,358 depict fuselages as rectangular shaped wings with a relatively low wing aspect ratio that generate high induced drag and have insufficient longitudinal stability and pitch maneuver.

U.S. Pat. Nos. 2,406,506; 2,412,646 and 2,650,780 show classical "Flying Wing" concepts with short chords, low sweep angle of wings, and thick airfoils in the payload area, which generate high airfoil drag, while relatively low wing sweepback angle does not provide for a sufficient longitudinal stability and pitch maneuver of the aircraft.

U.S. Pat. No. 3,576,300 anticipates a "Flying Wing" concept with a delta shape and high sweep angle of the leading edge that results in low wing aspect ratio where jet engine air inlets are disposed on the upper surface of the central section in order to reduce the thickness of the boundary layer thereof. Low aspect ratio of the wings results in insufficient roll maneuver and generates high induced drag, which reduces aerodynamic efficiency that was achieved by boundary layer control in the area of jet engines air inlets. In addition, the distribution of craft weight and aerodynamic surfaces does not provide for sufficient longitudinal stability and pitch maneuver of the aircraft.

U.S. Pat. Nos. 3,761,041 and 4,149,688 disclose "Flying Body" concepts with horizontal and vertical stabilizing surfaces disposed on the trailing edge of the flying body. Very low wing aspect ratio of the fling body as an airlifting surface generates very high induced drag, while very small stabilizing surfaces with their short distance from the gravity center do not provide for required level of roll and pitch maneuver, as well as the longitudinal stability of the craft.

U.S. Pat. No. 5,082,204 anticipates a "Flying Wing" concept with a very complex trailing edge shape where both front and aft surfaces thereof are in the area of the central section. The aft surfaces of this craft improve longitudinal stability thereof when compared to the classical "Flying Wing" concept with a relatively low sweepback angle.

However, the interference drag, especially in the area of front and aft surfaces is very high, while short airfoil chords do not provide for a sufficient space for payload accommodation when relatively thin airfoils are used.

Model 1 (Air and Cosmos Magazine, No. 1386 of 1992) represents a "Flying Body" concept with a delta form, as well as a convexly shaped leading edge and straight-line trailing edge that include additional tail surfaces (vertical and horizontal) to increase longitudinal stability, as well as pitch and yaw maneuver. This concept provides for the formation of significant space for payload accommodation with relatively thin airfoils. The low wing aspect ratio of this body generates high induced drag and results in insufficient roll maneuver control capability of the craft. A small surface area of the tailplane compared to main body surface area and a relatively short distance between the tail surface and gravity center of the aircraft does not provide for a sufficient longitudinal stability and pitch maneuver thereof.

Model 2 (Air and Cosmos Magazine, No. 1386 of 1992) represents a combination of "Flying Body" and classical concepts where external wings are integrated with the flying body on the trailing edge thereof. This concept provides for a good roll and pitch maneuver control as well as sufficient longitudinal stability of the aircraft but generates a significant parasitic drag in the frontal area that produces a very low lift, while the middle section with a low span generates high induced drag. Complex aerodynamic shape in the area between front and aft section of the aircraft would represent challenges during the manufacturing process.

BWB Project represented one of the latest serious attempts to apply the "Flying Wing" idea on the large Jumbo Jet subsonic aircraft. This project was based on the idea to minimize the size of aerodynamic surfaces that are exposed to airflow in order to achieve a minimum friction drag by eliminating fuselage and tail surfaces with the entire surface of the aircraft generating lift, while span and airfoil chords of the external wings are designed to minimize induced drag to the highest extent possible. Having this principle as guidance, the project got into serious troubles related to insuring sufficient space for payload accommodation by using relatively thin airfoils, while the wingspan reached proportions that are very close to limiting the maneuver of such aircraft on existing airports. The problem with shortage of space for payload accommodation was attempted to be resolved by increasing the relative thickness of the airfoils in the payload area, which increased drag and significantly reduced aerodynamic efficiency especially at high subsonic speed. Another problem is related to insufficient longitudinal stability and maneuver control of the aircraft that is required for civil aircraft, which is the key shortcoming of this concept.

U.S. Pat. No. 6,578,798 discloses a "Flying wing" concept with added aft aerodynamic surfaces for the longitudinal stabilization of aircraft, which were created as the result of the division of aerodynamic surfaces on their external ends. This concept resolved the problem of payload accommodation by using airfoils with relatively low thickness, as well as the problem related to longitudinal stability and maneuver control requirements. A shortcoming of this concept is unfavorable vertical position of the aft stabilizing aerodynamic surfaces relatively to the external wings that are positioned in front of them. The stabilizing surfaces are disposed aft of and below external wings, which would significantly reduce their efficiency and thereby flight safety during takeoff and landing when the flaps of the external wings are deflected downwardly. Another shortcoming of this idea is related to increased drag due to significant deformation of the under surface in the area of airlifting surface division.

BRIEF SUMMARY OF THE INVENTION

My "Tailed Flying Wing Aircraft" idea provides for the following applications and advantages:

a) Significant reduction of fuel consumption and increase in range and lift capacity when compared to existing large civil and military aircraft based on classical concept.

b) Significant increase in longitudinal stability and maneuverability, as well as reduction of profile and wave drag at high subsonic speed when compared to concepts of large aircraft that are based on the existing art pertaining to "Flying Wing" concepts.

Accordingly, besides the objects and advantages of the patents described above in my patent application, several objects of my "Tailed Flying Wing Aircraft" idea are:

1. Provide for higher lift capacity regarding existing large civil and military aircraft by transforming surface area of the fuselage into an airlifting surface.
2. Significantly reduce parasitic drag of large subsonic aircraft by transforming fuselage into an airlifting surface and smoothly blending it with external wings.
3. Significantly increase longitudinal stability and maneuverability of large subsonic aircraft concept that is based on "Flying Wing" or "Flying Body" idea.
4. Significantly reduce the length of runways with improved safety during takeoff and at landing for large aircraft based on the classical concept by significantly increasing airlifting surface area and ground effect coupled with very good maneuverability control in all three axes.
5. Reduce wing span relatively to large aircraft based on classical "Fuselage" and "Flying Wing" concepts, thereby providing for easy maneuver on existing airports.

Still further objects and advantages will become apparent from a consideration of the ensuing description and drawings. Although the description contains many specifics, these should not be construed as limiting the scope of the invention but as merely providing illustrations of some of the presently preferred embodiments of this invention. Thus the scope of the invention should be determined by the appended claims and their legal equivalents, rather than by the examples given.

SHORT DESCRIPTION OF DRAWINGS

Figure 1C:
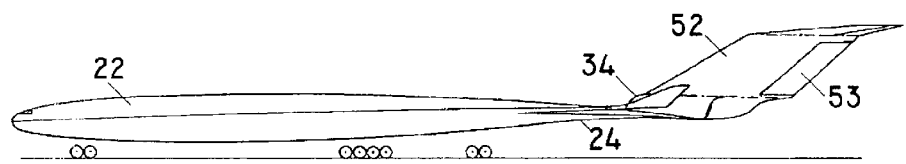

FIG. 1 shows a concept of large subsonic aircraft comprising of:

A specially designed main body as airlifting surface

A unique central jet engine pylon in which three jet engines are situated. The central jet engine pylon is disposed on the trailing edge of the main body central section above its upper surface so that the rear portion of the central jet engine extends aft of the main body trailing edge.

A fin with rudder being joined the central jet engine pylon on the topside thereof A tailplane being joined the fin.

FIG. 2 shows a concept of large subsonic aircraft composed of.

A specially designed main body that is shaped as an airlifting surface

A central jet engine pylon that is placed on the trailing edge of the main body central section over its upper surface so that the rear portion of the central jet engine pylon extends aft of the main body trailing edge.

Two lateral jet engine pylons that are disposed on the trailing edge of the main body over its upper surface in the area where the main body trailing edge has a high sweepforward angle so that the outboard lateral side of the lateral jet engine pylons extends aft of the main body trailing edge.

A fin with rudder being joined the central jet engine pylon on the top side thereof A tailplane being joined the fin.

FIG. 3 shows a concept of large subsonic aircraft composed of:

A specially designed main body of a large aircraft that is shaped as an airlifting surface Two lateral jet engine pylons that are disposed on the trailing edge of the main body over its upper surface in the area where the main body trailing edge has a high sweepforward angle so that the outboard lateral side of the lateral jet engine pylons extends aft of the main body trailing edge.

Two symmetrical tailplane halves that are joined the lateral jet engine pylons on their outboard sides.

REFERENCE NUMERALS IN DRAWING 22 main body
23 main body upper surface
24 main body under surface
25 main body leading edge
26 main body trailing edge
27 main body external wings
28 main body transition sections
29 main body central section
32 central jet engine pylon
33 central jet engine pylon lip
34 central jet engine air inlet
42 lateral jet engine pylon
43 lateral jet engine lip
44 lateral jet engine air inlet
45 lateral stabilizer
52 fin
53 rudder
62 tailplane
63 elevators
64 tailplane half
65 tailplane half leading edge strake

DETAILED DESCRIPTION OF THE INVENTION

FIGS. 1 to 3 show three aerodynamic concepts of large tailed flying wing subsonic aircraft.

FIG. 1 shows a new aerodynamic concept for large high subsonic aircraft that is composed from main body 22, central jet engine pylon 32, fin 52 with rudder 53, and tailplane 62 with elevator 63. Main body 22 is shaped as a unique airlifting body that is defined with main body upper surface 23, main body under surface 24, main body leading edge 25, and main body trailing edge 26. Cross sections of main body 22 in airflow direction have airfoil shapes. Merging lines between main body leading edge 25 and main body trailing edge 26 in the direction of airflow represent chords of the main body airfoils.

Main body 22 along its span has three distinctive sections: main body central section 29, two symmetrical main body transition sections 28, and two symmetrical main body external wings 27. Main body central section 29 with its very long chords represents the largest section of the airlifting surface of main body 22, which is used for bulky payload accommodation.

Main body transition section 28 is a transition section between main body central section 29 and main body external wing 27, which is distinctive by the significant shortening of its chord length along the span thereof. Main body transition section 28, which nevertheless has long chords and large thickness, represents a significant portion of the airlifting surface of main body 22, which is used for disposal of landing gears and the largest portion of fuel, as well as for accommodation of less bulky payload (luggage compartments).

Main body external wings 27, which have large span and high wing aspect ratio, represent a significant airlifting surface of main body 22. They are disposed at a large distance from the symmetry axis of the airplane and far aft of aircraft gravity center, hence being used for roll maneuver and significantly contributing to longitudinal stabilization of the aircraft.

Main body leading edge 25 and main body trailing edge 26 have smooth and continuous lines with a large curvature radius along the entire span thereof, which provides for the formation of main body upper surface 23 and main body under surface 24 that are smooth and continuous surfaces with very smooth transitions along the transverse axis to preserve the laminar airflow character along the entire span of main body 22. In order to optimize the shape of aerodynamic surfaces of main body central section 29, where the curvature radius of the nose leading edge is low, an alternative shape with large radius can be used (shown on right hand side in FIG. 1), however, with the shape of the front cone of main body 22 being separately defined and tangentially aligned with the aft portion of main body 22.

Main body leading edge 25 has a sweepback that is adjusted for high subsonic flight speed whose angle in the area of transition and central section goes up to 50° with the purpose of shifting the aircraft gravity center forward as much as possible relatively to external wings and hence, providing for higher contribution of external wings in longitudinal stability of the aircraft. When compared to BWB leading edge sweep angle, which goes up to 55°, the main body leading edge angle of 50° provides for better aerodynamic efficiency of central section 29 in all flight configurations. The main body leading edge sweepback angle in the area of external wings 27 goes lower, down to 45°, in order to provide for better aerodynamic efficiency of wing tips at lower flight speed.

Main body trailing edge 26 in the area of main body external wings 27 also has a sweepback angle that is lower than the sweepback angle of main body leading edge 25. Sweepback angle of main body trailing edge 26 is gradually getting lower near the root of main body external wings 27 and reaches zero degree angle on the outboard end of external wings 27. Sweepback angle of main body trailing edge 26 and the chord length on the external wing tip are adjusted to attain as high aspect ratio of external wings 27 as possible in order to generate low induced drag and simultaneously attain sufficient surface area of external wings 27 that will provide for satisfactory roll maneuver and satisfactory contribution of external wings 27 to the longitudinal stabilization of the aircraft but also simultaneously maintain such main body span size that will allow for easy maneuver of aircraft on existing airports. The result of this compromise is lower aspect ratio of the external wings 27 than the wing aspect ratio of the existing passenger aircraft with the classic design concept, which is unfavorable from the aspect of induced drag generation. However, due to transformation of the tube-like fuselage surface into an airlifting surface, the entire airlifting surface area of the new aircraft is drastically increased up to 2.2 times for the same payload capacity, hence the lift coefficient being reduced by the same ratio, whereby reducing the coefficient of induced drag by this ratio's square value. In this way, despite the lower aspect ratio of external wings 27, it is possible to reduce the overall induced drag of this aircraft when compared to the classical concept by up to 50% by means of size and shape of airlifting surfaces only.

Main body trailing edge 26 is gradually curving in the aft direction in the area of main body transition section 28, thereby forming a variable sweepforward whose maximum angle reaches 50 to 60 degrees with the purpose of elongating the chords of main body 22 to reach such values in the area of main body central section 29 that will provide for the inner space for bulky payload accommodation by using relatively thin airfoils to design outer aerodynamic surfaces of main body 22, thus retaining a high degree of aerodynamic efficiency of the aircraft even at high subsonic speed. In addition to providing for required inner height of the space required for bulky payload accommodation with airfoils of low relative thickness, very long chords of main body 22 in the area of central section 29 also provide for significant length of space for payload accommodation so that the bulky payload (passenger) distribution is concentrated closer to the symmetry plane of the aircraft as opposed to classic concept of "Flying Wing" that has short airfoil chords.

Payload concentration in the vicinity of the longitudinal axis of the aircraft offers a couple of advantages:

Passengers on the outer ends of the passenger section are exposed to lower acceleration during roll maneuver of the aircraft.

It is possible to provide for a sufficient space for disposal of large quantities of fuel in front of aircraft gravity center at safe distance laterally from the passenger accommodation areas, thereby allowing to maintain the fixed position of aircraft gravity center during the entire flight.

It is possible to provide for a sufficient space to dispose main landing gears out of passenger accommodation area without deformation of the external aerodynamic surfaces.

Very favorable distribution of airframe, payload and fuel mass with respect to distribution of airlifting forces and a very few number of larger concentric joints among airframe sections of aircraft provide for design of significantly lighter airframe when compared to the classical concept, thereby resulting in additional drag reduction.

Relatively unfavorable shape of main body 22 in the area of pressurization relatively to cigar-like fuselage of the classical aircraft concept would increase the airframe weight of the new aircraft relatively to the classical aircraft concept. This shortcoming is possible to eliminate by creating a more favorable distribution of passenger compartments and integration thereof with the airframe.

A large and elongated transition section 28 and central section 29 in the rear direction shift the aircraft gravity center in the same direction relatively to external wings, thereby significantly destabilizing aircraft in the longitudinal direction. However, this shortcoming is eliminated when taking into account that the trailing edge of central section 29, which is mostly shifting in the rear direction, carries the central jet engine pylon 32 that is shifting stabilizing tailplane surfaces 62 indirectly in the same direction, however, much faster than mass gravity center, whereby resulting in much better longitudinal stability and pitch maneuver than it is possible to achieve with tailless flying wing concept.

Central jet engine pylon 32 is disposed in the area of central section 29 on its trailing edge above main body upper surface 23. Airframe of central jet engine pylon 32 is directly integrated with main body airframe. Jet engines are linearly disposed within central jet engine pylon 32. The front part of central jet engine pylon 32 is formed as a lip, which together with main body upper surface 23 form central jet engine air inlet 34. Central jet engine air inlet 34 formed like this accelerates air that is near main body upper surface 23 in front of air inlet, thereby significantly decreasing the thickness of the boundary layer and additionally increasing aerodynamic efficiency of main body 22. The rear portion of central jet engine pylon 32 extends aft of trailing edge 26 in order to provide for more favorable longitudinal position of fin 52 that is joined central jet engine pylon 32 on its top side.

Fin 52 with rudder 53 are having long chords, short span, and being slightly narrowed. They are directly joined central jet engine pylon 32 with the main purpose to provide for the most favorable longitudinal and vertical position of tailplane 62 with elevator 63. Additionally, fin 52 with rudder 53 control very efficiently directional stability of aircraft and provide for efficient yaw maneuver control. Due to very small destabilizing lateral surfaces of the main body 22 in front of aircraft gravity center, the surface area of vertical tail is significantly smaller than the surface area of vertical tail of a classical concept aircraft.

Tailplane 62 with elevators 63 are disposed at a large distance aft of aircraft gravity center, hence providing very efficiently for a good longitudinal stability and pitch maneuver of aircraft with relatively small surface area thereof. The vertical position of tailplane 62 is adjusted to completely avoid the turbulent airflow behind main body 22.

Rough aerodynamic analyses show that by applying the new tailed flying wing aircraft concept on large high subsonic aircraft, the following can be achieved:

Decrease in fuel consumption of at least two times per one pound of payload and one mile of distance traveled when compared to present large aircraft based on the classical aircraft concept. This is possible to achieve by completely eliminating parasitic drag of large fuselage surface area by transforming thereof into an airlifting surface, hence drastically reducing airfoil and induced drag. In addition, a large interference drag is entirely eliminated in the joint area between wings and fuselage, as well as landing gears disposal area. Much more favorable distribution of airframe, payload, and fuel mass relatively to the aerodynamic forces for the new concept aircraft results with significantly lighter airframe when compared to the classical concept, which additionally reduces airfoil and induced drag. The reduction in boundary layer thickness in front of air inlet significantly reduces friction drag. Significantly lower fuel consumption requires lower takeoff fuel weight for the same range, which also additionally reduces airfoil and induced drag. Ability to increase bulky payload capacity by more than 30% for the same aerodynamic surface area and external dimensions of aircraft reduces fuel consumption per one pound of payload.

Range increase of the new concept aircraft relatively to the classical concept allows aircraft to reach any point on earth without landing or refueling, thereby increasing air traffic efficiency.

Reduction of external aircraft dimensions for the same payload relatively to the classical concept, thereby providing for efficient maneuver on the existing airports for aircraft of over 800 passengers.

Significant reduction in takeoff and landing runway due to significantly larger airlifting surface area and very favorable distribution of means for hyper lift production, as well as due to significant ground effect.

Provide for high level of flight safety in all flight regimes and weather conditions at the same level achieved by classical concept aircraft with high level of stability and maneuverability in all three axes, which is not a realistic outcome for aircraft based on tailless flying wing concept.

A high level of aerodynamic efficiency at high subsonic speed of over 0.85 Mach by using thin airfoils across the entire span of the aircraft including passenger area, which is also impossible to achieve for aircraft based on the tailless flying wing concept.

FIG. 2 shows a "Tailed Flying Wing Aircraft" concept that is different from the aircraft concept show in FIG. 1 by having two lateral jet engine pylons 42 in the area of the transition section where sweepforward angles of main body trailing edge 26 are highest. The lateral pylons are disposed above main body upper surface 23 so that their outboard ends extend aft of main body trailing edge 26. The airframe of lateral engine pylons is directly integrated with the airframe of main body 22 in the area where they coincide with each other. The lower surface of the lateral Jet engine pylons 42, which extends aft of main body trailing edge 26, is tangentially continuing onto main body under surface 24. Lateral jet engine pylons 42 on the inner side thereof have a transition section that is in fact an aerodynamic former that has the purpose of interference drag reduction between main body upper surface 23 and jet engine pylons. This aerodynamic former simultaneously increases the airframe thickness, thereby providing for more favorable transfer of inertia force of the engine onto the main body airframe. The disposal of lateral jet engine pylons 42 in the area of main body transition section 28 provides for very high sweepforward angles of main body trailing edge 26 without additional increase of vertex airflow around main body trailing edge 26. The vortex airflow is possible to additionally reduce by adding thin lateral stabilizers 45 on the top side of the lateral jet engine pylons 42. Lateral stabilizers 45 can be in vertical position or "V" configuration. Increased sweepforward angles of main body trailing edge 26 provide for reduction of the overall surface area of the aircraft, weight reduction, and aspect ratio increase of main body external wings 27, hence reduction of overall drag and fuel consumption of aircraft.

The disposal of lateral engine pylons in the area of the transition section provides for more favorable position of flaps in the area of the central section where chords are longest, hence providing for much better efficiency thereof during landing or takeoff. The weight of lateral jet engines is shifted forward, which provides for more favorable position of aircraft gravity center.

The shortcomings of this concept relatively to concept shown in FIG. 1 are: larger friction drag of engine pylons and less favorable integration of the airframe of lateral jet engine pylons 42 with the main body airframe, which increases the airframe weight of the aircraft.

The aircraft concepts shown in FIGS. 1 and 2, which have a high degree of longitudinal stability, are favorable for large civil aircraft for mass passenger transport.

FIG. 3 shows a "Tailed Flying Wing Aircraft" concept, which is different from the concepts shown in FIGS. 1 and 2 by having tailplane halves 64 connected directly to lateral jet engine pylons 42 without fin 52. Lateral jet engine pylons 42 are connected to main body 22 in a similar way as lateral jet engine pylons 42 shown in FIG. 2, however, with pylons being longer and further extended in the aft direction with larger transition section in order to provide for the maximum possible distance of the tailplane halves 64 from the aircraft gravity center, as well as to provide for transition of aerodynamic and inertia forces of tailplane 62 into the main body airframe with as light weight of pylons and main body airframes as possible. Tailplane halves 64 are having leading edge strake 65 that begins from the point where lateral jet engine pylon lip 43 joins main body trailing edge 26, hence preventing vortex airflow in this area Tailplane halves 64 are having a dihedral angle to avoid turbulent airflow behind main body 22.

The advantage of this concept over concepts shown in FIGS. 1 and 2 is a complete prevention of vortex airflow generation in the area of main body transition section 28 and elimination of vertical stabilizer, thereby reducing interference drag between fin 52 and tailplane 62, which is existent for concepts shown in FIGS. 1 and 2. This concept also provides for higher efficiency of the central flaps during landing and at takeoff.

The shortcomings of this concept over concepts shown in FIGS. 1 and 2 include a shorter distance of tailplane halves 64 from aircraft gravity center, which results in lower degree of longitudinal stability and pitch maneuver control, or it requires significantly larger surface areas of tailplane halves 64, which increases the weight and overall drag of the aircraft.

This concept is favorable for application on military and cargo aircrafts.

We claim:

1. A large subsonic aircraft having a plane of symmetry and a transverse axis, said transverse axis being perpendicular to said plane of symmetry, said plane of symmetry including a longitudinal and a vertical axis, said longitudinal axis being perpendicular to said vertical axis, said longitudinal axis coinciding with the direction of airflow, said large subsonic aircraft comprising:

a) a main body extending along said transverse axis, said main body being composed of a central section, two symmetrical transition sections and two symmetrical external wings, the main body central section, the transition sections, and the external wings being blended into a unique airlifting body with smooth aerodynamic surfaces, said main body having an upper and an under surface, a leading and a trailing edge, the main body cross sections having airfoil shapes in airflow direction, the main body airfoils having chords that extend between the main body leading and trailing edge, said main body leading edge having a sweepback, said main body trailing edge in the area of said main body external wings having a sweepback, the trailing edge sweepback angle on the external wings inboard ends being zero, the leading edge sweepback angles, the trailing edge sweepback angles, the external wings span, and the length of the main body chords on the external wings outboard ends being adjusted to generate low induced drag and simultaneously provide for a sufficient contribution of said main body external wings in sustaining longitudinal stability of said large subsonic aircraft, said main body trailing edge is arching substantially in aft direction from said external wings inboard ends to said plane of symmetry, thus a trailing edge sweepforward is being formed, the trailing edge sweepforward maximum angle exceeding 40 degrees in the area of said main body transition sections, hence resulting in very long said main body chords in the area of said main body central section, thereby providing for formation of inner space for a bulky payload accommodation by using thin main body airfoils, whereby said main body with smooth aerodynamic surfaces, thin airfoils, large airlifting surface area, and low induced drag generation providing for a high lift capacity and high aerodynamic efficiency of said large subsonic aircraft at high subsonic speed, b) a central jet engine pylon with at least one jet engine being situated therein, said jet engine pylon being disposed on the rear portion of said main body over the main body upper surface so that said plane of symmetry is simultaneously the central jet engine pylon symmetry plane, the central jet engine pylon airframe being directly integrated with the main body airframe, the front portion of said central jet engine pylon having an aerodynamically shaped lip, the central jet engine pylon lip with said main body upper surface constitute a central jet engine air inlet, thus significantly reducing the thickness of boundary layer over said main body upper surface in front of said central jet engine air inlet, whereby additionally increasing aerodynamic efficiency of said large subsonic aircraft, c) a fin with rudder being joined said central jet engine pylon on the top thereof so that said plane of symmetry being simultaneously the fin symmetry plane, said fin with rudder being at a great distance from the gravity center of said large subsonic aircraft, whereby significantly increasing yaw control and directional stability of said large subsonic aircraft, d) a tailplane with elevators extending along said transverse axis on both sides of said plane of symmetry, said tailplane with elevators being joined said fin, the tailplane vertical position being adjusted to avoid turbulent airflow aft of said main body, the longitudinal position and surface area of said tailplane with elevators being adjusted to provide for sufficient pitch maneuver and longitudinal stability of said large subsonic aircraft that meet stability requirements for a civil aircraft.

2. A large subsonic aircraft having a plane of symmetry and a transverse axis, said transverse axis being perpendicular to said plane of symmetry, said plane of symmetry including a longitudinal and a vertical axis, said longitudinal axis being perpendicular to said vertical axis, said longitudinal axis coinciding with the direction of airflow, said large subsonic aircraft comprising:

a) a main body extending along said transverse axis, said main body being composed of a central section, two symmetrical transition sections and two symmetrical external wings, the main body central section, the transition sections, and the external wings being blended into a unique airlifting body with smooth aerodynamic surfaces, said main body having an upper and an under surface, a leading and a trailing edge, the main body cross sections having airfoil shapes in airflow direction, the main body airfoils having chords that extend between the main body leading and trailing edge, said main body leading edge having a sweepback, said main body trailing edge in the area of said main body external wings having a sweepback, the trailing edge sweepback angle on the external wings inboard ends being zero, the leading edge sweepback angles, the trailing edge sweepback angles, the external wings span, and the length of the main body chords on the external wings outboard ends being adjusted to generate low induced drag and simultaneously provide for a sufficient contribution of said main body external wings in sustaining longitudinal stability of said large subsonic aircraft, said main body trailing edge is arching substantially in aft direction from said external wings inboard ends to said plane of symmetry, thus a trailing edge sweepforward is being formed, the trailing edge sweepforward maximum angle exceeding 40 degrees in the area of said main body transition sections, hence resulting in very long said main body chords in the area of said main body central section, thereby providing for formation of inner space for a bulky payload accommodation by using thin main body airfoils, whereby said main body with smooth aerodynamic surfaces, thin airfoils, large airlifting surface area, and low induced drag generation providing for a high lift capacity and high aerodynamic efficiency of said large subsonic aircraft at high subsonic speed, b) a central jet engine pylon with at least one jet engine being situated therein, said jet engine pylon being disposed on the rear portion of said main body over the main body upper surface so that said plane of symmetry is simultaneously the central jet engine pylon symmetry plane, the central jet engine pylon airframe being directly integrated with the main body airframe, the front portion of said central jet engine pylon having an aerodynamically shaped lip, the central jet engine pylon lip with said main body upper surface constitute a central jet engine air inlet, thus significantly reducing the thickness of boundary layer over said main body upper surface in front of said central jet engine air inlet, whereby additionally increasing aerodynamic efficiency of said large subsonic aircraft, c) a fin with rudder being joined said central jet engine pylon on the top thereof so that said plane of symmetry being simultaneously the fin symmetry plane, said fin with rudder being at a great distance from the gravity center of said large subsonic aircraft, whereby significantly increasing yaw control and directional stability of said large subsonic aircraft, d) a tailplane with elevators extending along said transverse axis on both sides of said plane of symmetry, said tailplane with elevators being joined said fin, the tailplane vertical position being adjusted to avoid turbulent airflow aft of said main body, the longitudinal position and surface area of said tailplane with elevators being adjusted to provide for sufficient pitch maneuver and longitudinal stability of said large subsonic aircraft that meet stability requirements for a civil aircraft, e) two symmetrical lateral jet engine pylons being placed over said main body upper surface in the area where said main body trailing edge is having high sweepforward angles, said lateral jet engine pylons overlapping said main body trailing edge, thereby reducing vortex airflow around said main body trailing edge, the lateral jet engine pylons airframe being directly integrated with the main body airframe, the lateral jet engine pylon front portion having an aerodynamically shaped lip, the lateral jet engine pylon lip with said main body upper surface constitute a lateral jet engine air inlet, thus significantly reducing thickness of boundary layer over said main body upper surface in front of said lateral jet engine air inlets, whereby additionally increasing aerodynamic efficiency of said large subsonic aircraft.

3. A large subsonic aircraft having a plane of symmetry and a transverse axis, said transverse axis being perpendicular to said plane of symmetry, said plane of symmetry including a longitudinal and a vertical axis, said longitudinal axis being perpendicular to said vertical axis, said longitudinal axis coinciding with the direction of airflow, said large subsonic aircraft comprising:

a) a main body extending along said transverse axis, said main body being composed of a central section, two symmetrical transition sections and two symmetrical external wings, the main body central section, the transition sections, and the external wings being blended into a unique airlifting body with smooth aerodynamic surfaces, said main body having an upper and an under surface, a leading and a trailing edge, the main body cross sections having airfoil shapes in airflow direction, the main body airfoils having chords that extend between the main body leading and trailing edge, said main body leading edge having a sweepback, said main body trailing edge in the area of said main body external wings having a sweepback, the trailing edge sweepback angle on the external wings inboard ends being zero, the leading edge sweepback angles, the trailing edge sweepback angles, the external wings span, and the length of the main body chords on the external wings outboard ends being adjusted to generate low induced drag and simultaneously provide for a sufficient contribution of said main body external wings in sustaining longitudinal stability of said large subsonic aircraft, said main body trailing edge is arching substantially in aft direction from said external wings inboard ends to said plane of symmetry, thus a trailing edge sweepforward is being formed, the trailing edge sweepforward maximum angle exceeding 40 degrees in the area of said main body transition sections, hence resulting in very long said main body chords in the area of said main body central section, thereby providing for formation of inner space for a bulky payload accommodation by using thin main body airfoils, whereby said main body with smooth aerodynamic surfaces, thin airfoils, large airlifting surface area, and low induced drag generation providing for a high lift capacity and high aerodynamic efficiency of said large subsonic aircraft at high subsonic speed, b) two symmetrical lateral jet engine pylons being placed over said main body upper surface in the area where said main body trailing edge is having high sweepforward angles, said lateral jet engine pylons overlapping said main body trailing edge, the lateral jet engine pylon front portion having an aerodynamically shaped lip, the lateral jet engine pylon lip with said main body upper surface constitute a lateral jet engine air inlet, thus significantly reducing thickness of boundary layer over said main body upper surface in front of said lateral jet engine air inlets, whereby additionally increasing aerodynamic efficiency of said large subsonic aircraft, c) two symmetrical tailplane halves with elevators, each tailplane half being joined said lateral jet engine pylon on its outboard side, the tailplane half extending along said transverse axis and having a leading edge strake, said leading edge strake being joined said lateral jet engine lip, thereby preventing vortex airflow around said lateral jet engine pylons, said tailplane half having a dihedral, the tailplane half dihedral being adjusted to avoid turbulent airflow aft of said main body, the longitudinal position and surface area of said tailplane halves with elevators being adjusted to provide for sufficient pitch maneuver of said large subsonic aircraft and meet longitudinal stability requirements for a civil aircraft.

\* \* \* \* \*